United States Patent [19]
Samba

[11] Patent Number: 5,539,815
[45] Date of Patent: Jul. 23, 1996

[54] NETWORK CALL ROUTING CONTROLLED BY A MANAGEMENT NODE

[75] Inventor: Augustine S. Samba, Reynoldsburg, Ohio

[73] Assignee: AT&T Corp., Murray Hill, N.J.

[21] Appl. No.: 394,097

[22] Filed: Feb. 24, 1995

[51] Int. Cl.$^6$ .......................... H04M 7/00; H04M 15/00
[52] U.S. Cl. ..................... 379/220; 379/113; 379/224
[58] Field of Search .................................. 379/111, 112, 379/113, 114, 115, 116, 219, 220, 221, 222, 224, 229, 230

[56] References Cited

U.S. PATENT DOCUMENTS

| | | | |
|---|---|---|---|
| 4,345,116 | 8/1982 | Ash et al. | 379/221 |
| 4,979,118 | 12/1990 | Kheradpir | 379/221 X |
| 5,101,451 | 3/1992 | Ash et al. | 379/221 |

Primary Examiner—Jeffery Hofsass
Assistant Examiner—Harry S. Hong
Attorney, Agent, or Firm—Charles L. Warren

[57] ABSTRACT

A network management node (10) collects trunk loading data and switch congestion data from switches in a telecommunication system. Path loading vectors (52, 56,) constraint vector (66), and switch congestion vector (76) are calculated and compared to yield potential intermediate switch candidates having the lowest available trunk traffic loading and switches with the lowest congestion consistent with other constraints associated with intermediate switch selection. Trunk groups with increasing levels of traffic and switches with increasing levels of congestion are incrementally tested in order to yield potential intermediate switch candidates whereby call distribution to the lightest loaded trunks and switches is accomplished.

23 Claims, 5 Drawing Sheets

| SWITCH PATHS | PATH LOADING OF SWITCH (1) | | | |
|---|---|---|---|---|
| | LIGHT | MEDIUM | HEAVY | BUSY |
| 1 | – | – | – | – |
| 2 | | | 1 | |
| 3 | 1 | | | |
| 4 | | 1 | | |
| 5 | 1 | | | |
| 6 | 1 | | | |
| 7 | 1 | | | |
| 8 | | | | 1 |

FIG. 6

| SWITCH | CONGESTION | | | |
|---|---|---|---|---|
| | LIGHT | MEDIUM | HEAVY | BUSY |
| 1 | 1 | | | |
| 2 | | 1 | | |
| 3 | 1 | | | |
| 4 | | | 1 | |
| 5 | | 1 | | |
| 6 | 1 | | | |
| 7 | | 1 | | |
| 8 | | | | 1 |

FIG. 7

| NO. | PREDETERMINED ROUTING CONSTRAINTS | | | |
|---|---|---|---|---|
| | SWITCHES | DAYS | TIMES | EVENT |
| A1 | 6, 7 | MON-FRI | 00:00-08:00 18:00-24:00 | |
| A2 | 8, 7 | SAT & SUN | ALL | |
| A3 | 7, 8 | MON-FRI | 08:01-17:59 | |
| B1 | | | | |
| ⋮ | ⋮ | ⋮ | ⋮ | ⋮ |
| Z9 | 3 | DAILY | 12:01-13:00 | |

FIG. 8

| | CONSTRAINT SELECTION | | | | | | | |
|---|---|---|---|---|---|---|---|---|
| | 1 | 2 | 3 | 4 | 5 | 6 | 7 | 8 |
| 1 | − | | | | | B | B | A |
| 2 | | − | | | | C | D | Z |
| 3 | | | − | | | | | |
| 4 | | | | − | | | | |
| 5 | | | | | − | | | |
| 6 | | | | | | − | | |
| 7 | | | | | | | − | |
| 8 | | | | | | | | − |

NETWORK CALL ROUTING CONTROLLED BY A MANAGEMENT NODE

BACKGROUND OF THE INVENTION

This invention is generally directed to the routing of calls in a telecommunication network and is more specifically directed to the selection of an intermediate switch through which a call is to be routed between an originating switch and a destination switch.

Various techniques have been applied to control the routing of calls through a telecommunication network. A dynamic non-hierarchical routing arrangement is described in Ash U.S. Pat. No. 4,345,116 wherein each switch is equipped to match a received directory number and a corresponding destination switch. Based on the identification of a destination switch a plurality of predetermined direct and alternated routes for reaching the destination switching system is stored in a table. Although this system provided an advance, it suffers from disadvantages such as requiring a plurality of control messages to be passed within the system in order to determine if the predetermined paths stored in the routing table is available to handle a call. During times of heavy loading, these messages created significant traffic within the system, especially when a number of alternate paths had to be sequentially attempted due to heavy loading.

A real time network routing (RTNR) technique is described in Ash U.S. Pat. No. 5,101,451. In this arrangement an intermediate switch is selected by comparing traffic loading data of trunks of each of the intermediate switching systems between the origination switch and the destination switch. The selection of an intermediate switch among the potential intermediate switch candidates is based upon the loading of circuits associated with the intermediate switches. This technique has the advantage of responding to outages of switching systems or transmission facilities by routing around the systems or facilities, and further provides the advantage of normalizing the distribution of calls added to the system since lightly loaded intermediate switches are selected for handling calls.

The RTNR technique generally assumed that each switch within the network contained the necessary distributed intelligence to make a routing path decision. The technique also required the ability to obtain information concerning the loading of other switches upon demand in order to make such decisions. Thus, such a network is best suited for a system in which the switches utilized within the system are substantially identical or at least homogenous with regard to network administration and control. Systems which utilize a variety of types of switches which do not utilize identical control signaling or traffic load data makes the RTNR technique more difficult to effectively implement. The advantages of the RTNR technique do not extend to the routing of calls outside of the RTNR switching network, i.e. the routing of calls which must pass to another network such as in another country or a switching network controlled by a different company. Further, although the loading of intermediate switches is considered by the RTNR method, an independent consideration of the loading of the switch independent of the transmission facility paths associated with the switch is not taken into account. Thus, a switch which becomes loaded to near capacity by demands for processing in addition to the processing requirements associated with the volume of calls being handled may result in the inappropriate selection of a switch. Thus, there exists a need for even further advancements in network routing in order to further improve and achieve additional efficiencies beyond the prior control systems.

SUMMARY OF THE INVENTION

It is an object of the present invention to provide an improved call routing method for telecommunication systems which provide an advance over the art in accordance with the principles of this invention.

In accordance with an embodiment of the present invention, a network management node provides an automatic reroute feature which selects an optimum traffic path and is suited for use in a network of non-homogenous switches. The network management node is coupled to a primary network containing a plurality of telecommunication switches through which calls are routed. This network is connected to additional secondary networks containing other switches. The routing of calls which traverse the primary network is determined by the network management node based on periodically generated traffic data received from at least the switches within the primary network. The node also stores a routing table based on data received from switches contained in the secondary networks which define times and conditions of availability of the foreign switches to handle calls.

In response to a call request involving the primary network, a first vector is generated at the network management node based on the stored traffic data; elements in the first vector define the availability of other switches in the networks to serve as an intermediate switch for the call based on traffic levels. The node also generates a path constraint vector based on the information about the foreign switches stored in a routing table; an element in the path constraint vector corresponds to each of the potential intermediate switches. A comparison, such as logically AND'ing, the first vector and the path constraint vector produces a resulting selection vector having elements which define whether a corresponding switch is a candidate for selection as an intermediate switch. An intermediate switch is selected by the management node from among the potential candidate switches based on the selection vector. The management node then transmits control information to the origination, destination and intermediate switches to initiate the call setup.

In another aspect in accordance with the present invention, an additional determination is made of the congestion of each switch associated with the management node. This determination may be based upon congestion information provided to the management node by switches within the primary network or predetermined historical data or other information provided by the switches in the secondary networks. The switch congestion level is utilized to form a congestion vector which may be also logically AND' ed with the selection vector previously determined in order to enhance intermediate switch selection to favor switches with lighter overall congestion loads.

Additional advantages and applications will become apparent to those skilled in the art in view of the explanation of the embodiments of the invention which follow.

DETAILED DESCRIPTION

Figure 1:
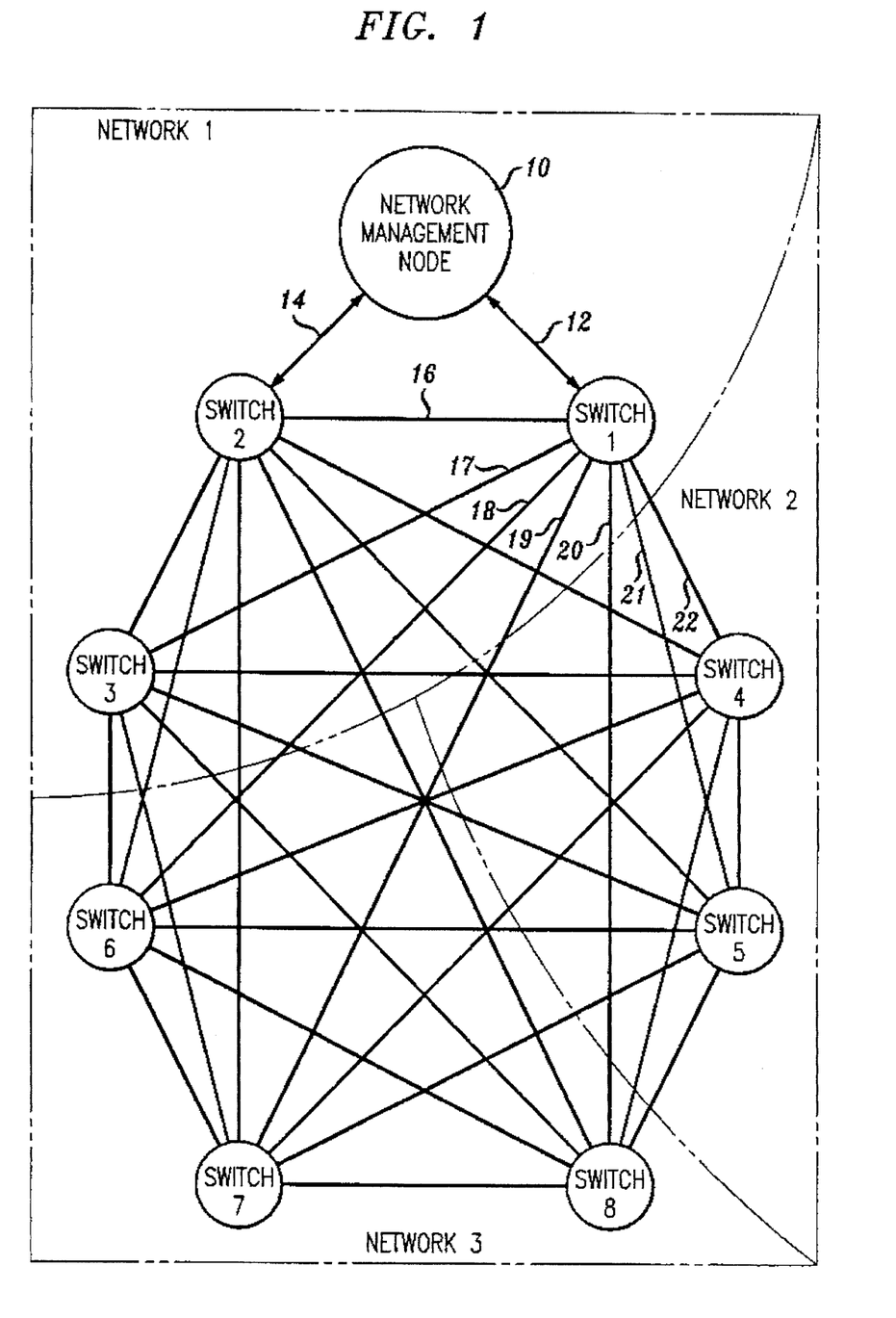
FIG. 1 is a block diagram of a telecommunication system which includes a network management node in accordance with an embodiment of the present invention.

FIG. 1 illustrates a telecommunication system in which separately administered networks 1, 2 and 3 each contain toll or long distance switches connected to other switches in the other networks. Primary network 1 includes illustrated switches 1, 2 and 3; secondary network 2 includes switches 4 and 5; secondary network 3 includes switches 6, 7 and 8. In the illustrative example each network may reside in a different country. The eight switches are connected to other switches (not shown) such as end user central office switches or other telecommunication nodes.

Network 1 includes a network management node 10 connected to switches 1 and 2 by communication paths 12 and 14, respectively. The network management node 10 may be utilized to administer the switches within network 1 and in accordance with the illustrated embodiment of the present invention, controls the routing of calls which originate, terminate, or pass through one of the switches in network 1.

Each of the illustrated switches is connected by a group of communication channels (trunk group) to each of the other switches. For example, switch 1 is connected by trunk groups 16, 17, 18, 19, 20, 21, and 22 to switches 2, 3, 6, 7, 8, 5, and 4, respectively. The switches may comprise an available toll switch such as the 4ESS™ switch available from AT&T Corp. The exemplary network management node 10 in accordance with an embodiment of the present invention provides an improvement over existing management nodes such as the NetMinder network traffic management system available from AT&T Corp.

In accordance with an aspect of the present invention, the illustrated switches may comprise different toll switches such as manufactured by different companies or consisting of different models and hence, constitute a non-homogenous architecture. In order to overcome difficulties associated with managing and routing calls in such a system, the network management node 10 is utilized as a centralized, intelligent node which controls the routing of traffic involving switches 1, 2, or 3.

Figure 2:
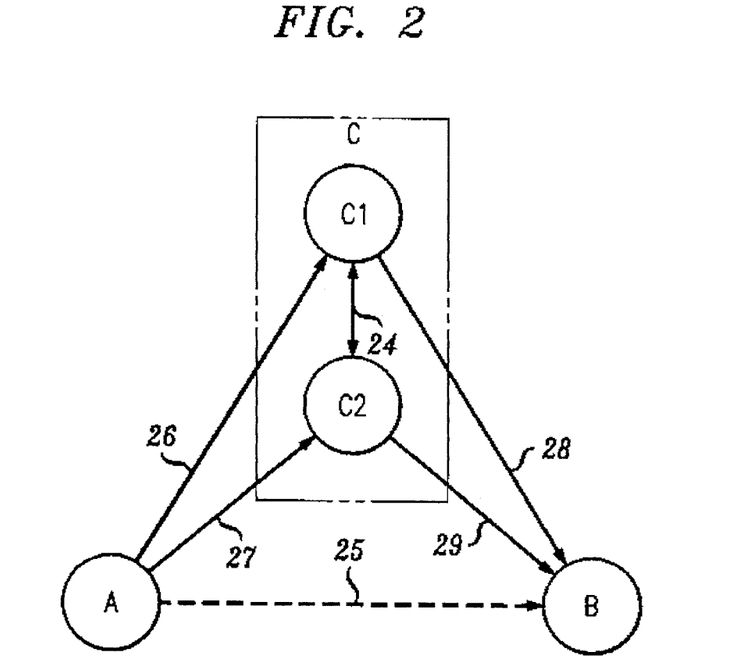
FIG. 2 illustrates a subset of three switches in a telecommunication network.

FIG. 2 illustrates an exemplary three-switch arrangement involving switches A, B, and C. Switch C consists of a pair of switches C1 and C2 interconnected by communication link 24 to provide redundancy and enhance the reliability of the telecommunication system. As an illustrative example, assume a call is desired to be routed from switch A to switch B, preferably over a direct trunk group 25. However, trunk group 25 is not available due to loading or other factors. Switch A will then attempt to establish communications to switch B by a single intermediate switch, such as switch C, which contains trunk groups connected to both switch A and B. In the illustrative example trunks groups 26 and 27 connect switch A to switch C and trunk groups 28 and 29 connect switch C to switch B. Assuming that switch C1 is the active switch normally utilized in switch C, the preferred selection for trunk groups would consist of trunks 26 and 28. However, if trunk group 26 is not available due to full trunk capacity, the alternate trunk group 27 may be utilized to communicate with switch C2 which can provide routing to switch B by trunk 29. Alternatively, switch C2 could establish a route to switch C1 so that the path from switch A would constitute trunk group 27, path 24, and trunk group 28. This alternate selection capability between trunk groups 26 and 27 between switches A and C provide an alternative path.

Trunk groups associated with switch C are referred to as a final trunk group meaning that it constitutes a final or last chance to route overflow traffic from a high usage trunk such as trunk 25 that is busy. Calls blocked on a final trunk group are not offered to another route. Trunk groups 26 and 27 are referred to as a mutual final trunk group since mutual paths 26 and 27 exist wherein the unavailability of trunk 26 will result in an attempt to establish a path using trunk group 27. If neither trunk group 26 and 27 are available, then the exemplary overflow call will be blocked, i.e. not accepted in the toll network for lack of capacity.

It will be apparent to those skilled in the art that each of the switches illustrated in FIG. 1 may be implemented as a complementary switch pair such as switch C as shown in FIG. 2 in order to provide increased telecommunication system reliability in the event of a failure of one switch in the pair. It will also be appreciated that the illustrated trunk groups shown in FIG. 1 may, in fact, comprise pairs of trunk groups in a mutual final arrangement as explained with regard to FIG. 2.

Figure 3:
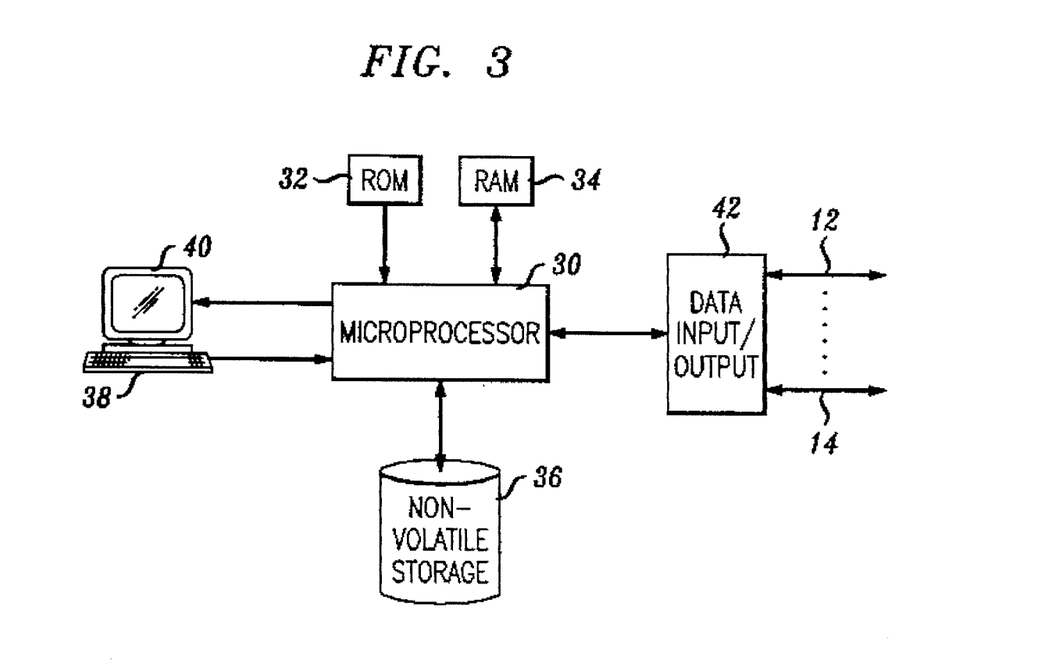
FIG. 3 illustrates a block diagram of an exemplary network management node in accordance with the present invention.

FIG. 3 illustrates a block diagram of an exemplary embodiment of a network management node 10. A microprocessor 30 is connected to a read-only memory (ROM) 32, a random access memory (RAM) 34, and a nonvolatile storage element 36 such as a hard disk drive or other nonvolatile data storage device. The microprocessor 30 is further coupled to and supported by a manual input device such as keyboard 38 and provides output to an administrator or user such as by monitor 40. A data input/output interface 42 is coupled to microprocessor 30 and provides an interface for two-way data communications such as on communication paths 12 and 14 to switches 1 and 2, respectively. The microprocessor 30 operates under the program control instructions stored in ROM 32 and additional program instructions which may be stored in nonvolatile storage element 36. The microprocessor periodically receives data routed by switches 1 and 2 concerning trunk group loading and switch congestion levels as will be explained in more detail below. The microprocessor acting in accordance with the stored program instructions stores the received data, generates corresponding tables of related data, generates and compares vectors based on the information in the data tables, makes routing path decisions, and transmits control signals on communication paths 12 and 14 to the switches in the telecommunication system to control the establishment of a call routing path. The determination and action for carrying out this control is explained in more detail below.

Figure 4:
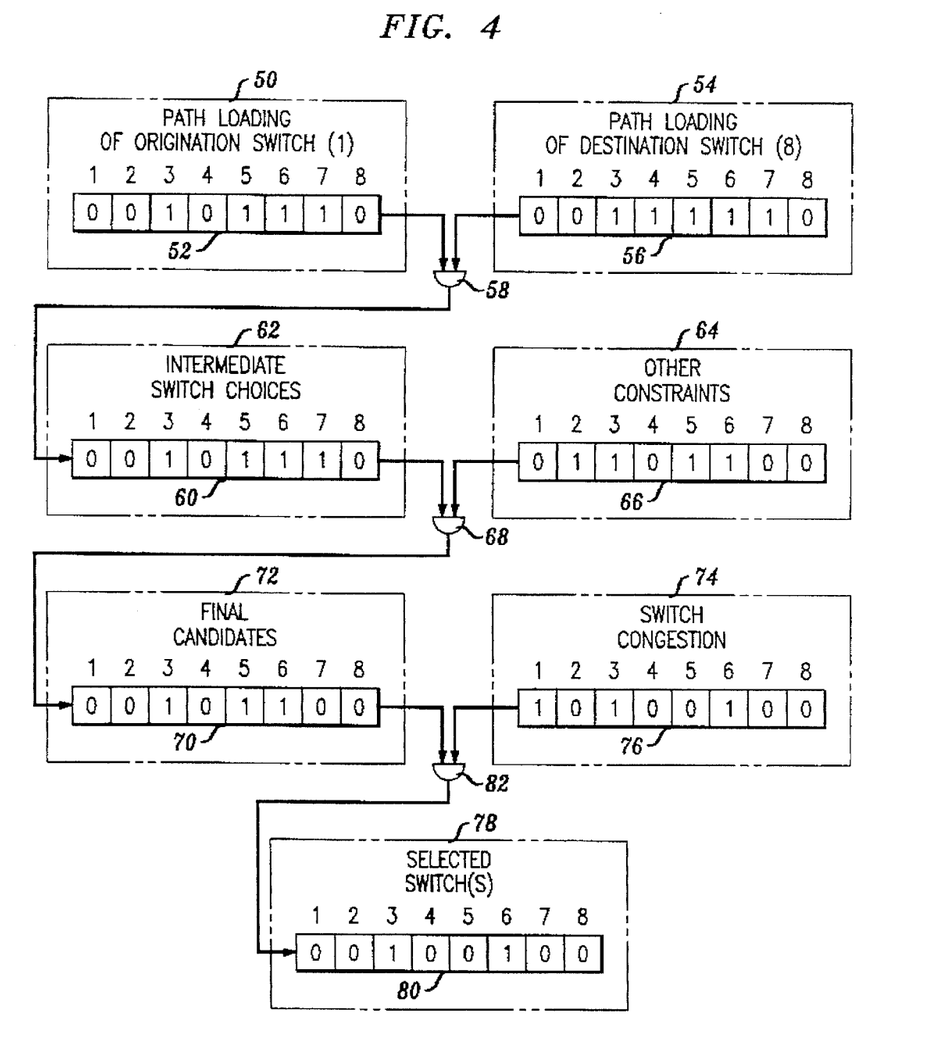
FIG. 4 provides a visual depiction of steps in accordance with an exemplary method of the present invention for selecting an intermediate switch.

FIG. 4 provides a visual representation of an exemplary method of the present invention by which the network management node 10 selects an intermediate switch to be utilized in a routing path. It will be understood that the selection of an intermediate switch normally presumes that a direct path between the origination switch and a destination switch in the toll network has been determined to be unavailable.

FIG. 4 illustrates an example in which a call request requires a path from switch 1, the origination switch, to switch 8, the destination switch. Since a switch in network 1 is part of the path, network management node 10 will control the routing of this traffic. The illustrative example further assumes that trunk group 20 which provides a direct path between switches 1 and 8 is unavailable, thereby requiring the selection of an intermediate node to establish a call path from switch 1 to switch 8.

In accordance with an embodiment of the present invention, step 50 relates to the generation by network management node 10 of path loading information associated with each of the trunk groups 16–22 connected to switch 1. A path loading vector 52 is generated in which each corresponding element or bit defines whether a predetermined traffic level exists on the trunk group between switch 1 and each of the other switches. In the illustrative example, a "1" in a vector element represents that the corresponding trunk between switch 1 and the indicated switch has a traffic load within the predetermined traffic level; a "0" indicates that the trunk group has a traffic load which is not within the predetermined traffic level. In accordance with a preferred embodiment of the present invention, a plurality of path loading vectors may be generated, each representing a different level of traffic loading such as light, medium, heavy, and busy. Assume that the illustrated vector 52 represents a loading vector representing a light path loading condition for the respective trunk groups. Thus, vector 52 defines that switches 3, 5, 6, and 7 had trunk groups connected to switch 1 which were lightly loaded. Since vector 52 is based on the loading of trunks connected to switch 1, the switch 1 bit position will always be a "0" since it would not represent a possible intermediate switch candidate.

Figure 5:
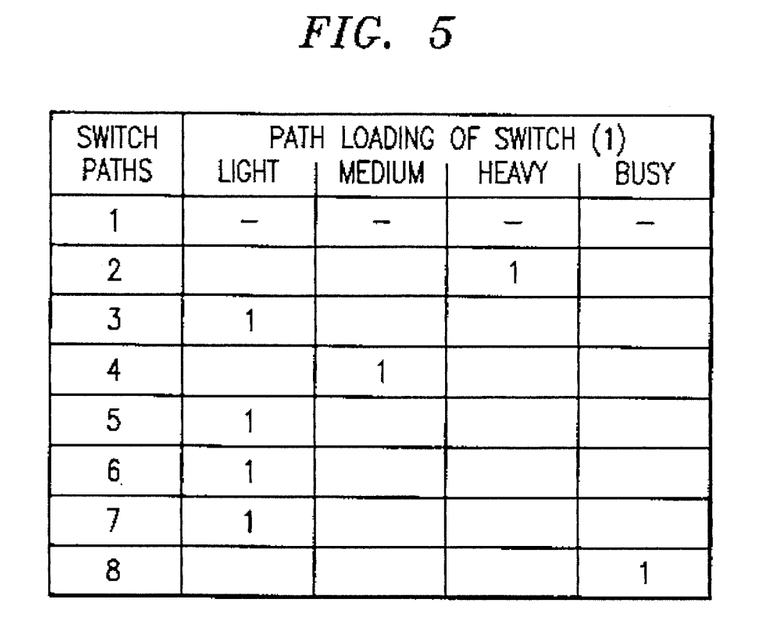
FIG. 5 illustrates a table in which the path loading of switch 1 is illustrated.

FIG. 5 illustrates a table of path loading data stored in network management node 10 which defines a corresponding traffic load for each of the paths trunk groups connected to switch 1 which, in the illustrative example, consists of four ranges: light, medium, heavy, and busy. It will be noted that the switch path 1 in the table contains no data which is representative of the fact that the table represents the loading of paths relative to switch 1 and hence, there is no relevant data relative to itself. The data representing the other switches indicates that switches 3, 5, 6, and 7 have lightly loaded trunks connected to switch 1, switch 4 has a medium loaded trunk connected to switch 1, switch 2 has a heavily loaded trunk connected to switch 1, and switch 8 has a busy trunk (full capacity) connected to switch 1. This table is generated by network management node 10 and is based on a combination of information including traffic loading data periodically received from switches, preferably in substantially real time, relating to associated trunk group loading and data based upon historical traffic loading information associated with individual switches. Tables corresponding to the other switches 2–8 are likewise maintained for use in the selection of paths involving the other switches.

Returning to FIG. 4, step 54 illustrates the generation of a path loading vector 56 by network management node 10 which defines the loading for trunks groups connected to switch 8. Vector 56, similar to vector 52, represents a lightly loaded traffic level condition and is based on a path loading table for switch 8. Vector 56 illustrates that trunk groups connected between switch 8 and switches 3, 4, 5, 6, and 7 are lightly loaded. Referring to FIG. 1, it will be observed that switch 8 is in network 3 and thus, the network management node 10 located in network 1 must rely upon cooperation with the administrating of network 3 to provide substantially real time data information relating to trunk loading or historical data associated with switch 8 which can be utilized to provide an estimate of the likely trunk loading patterns for a given day and time.

AND gate 58 combines vectors 52 and 56 to produce a resulting vector 60 shown in step 62 which is associated with intermediate switch choices. Vector 60 represents the logically ANDed combination of vectors 52 and 56 and illustrates that switches 3, 5, 6, and 7 each have a trunk group connected to both switches 1 and 8 which are lightly loaded. Step 64 illustrates the generation of another vector 66 having elements corresponding to each of the eight switches that represent other constraints associated with path selection.

Figure 7:
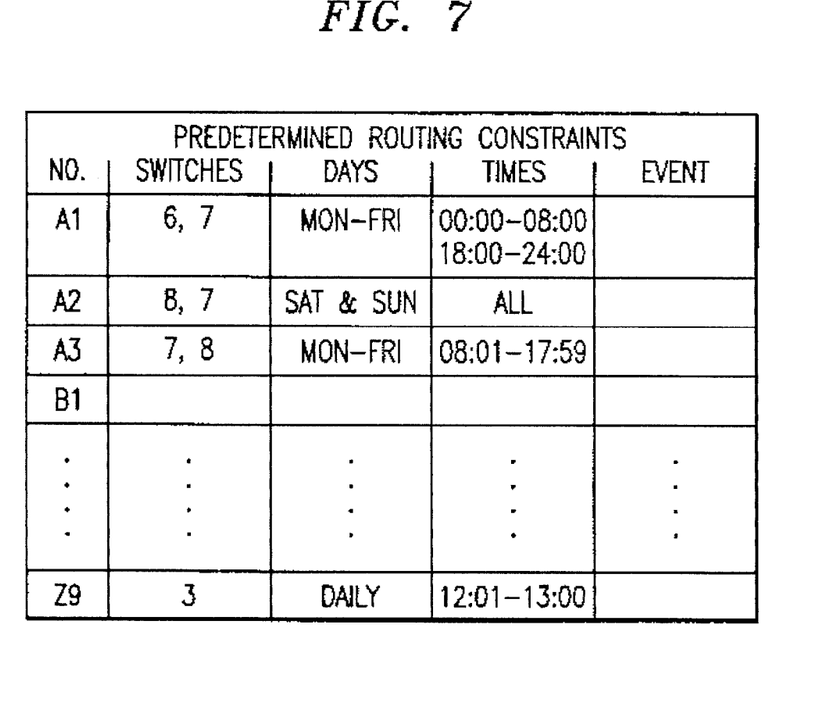
FIG. 7 illustrates a data table in which predetermined routing constraints associated with different switches are stored.

FIG. 7 illustrates a table of data stored in network management node 10 which contains data relating to predetermined routing constraints associated with switches in the system. In the illustrative example, the constraints are grouped in tuples or rows indicated by a common letter with numeric suffixes, for example, A1–A3. The data corresponding to these "A" rows define a predetermined set of conditions related to routing constraints. In the illustrated table, these constraints relate to switches contained in network 3 (switches 6, 7, 8) and define days and corresponding times for which the switches are available to serve as an intermediate switch. The predetermined routing constraints shown in FIG. 7 may be based on the historical traffic conditions and the desire of the administrator of the network to maintain control of which switches within the local network can be utilized as an intermediate switch. It will be apparent to those skilled in the art that if a switch is required to serve as an origination switch or a destination "termination" switch, such constraints are unnecessary since the switch will be required to handle such a call unless it has no capacity. Thus, an administrator of a network can control switch loading in order to favor a given switch during a particular day and time in order to insure that it will be available to function as an origination or destination switch in accordance with service to its local network customers by controlling or limiting its availability to serve as an intermediate node.

Figure 8:
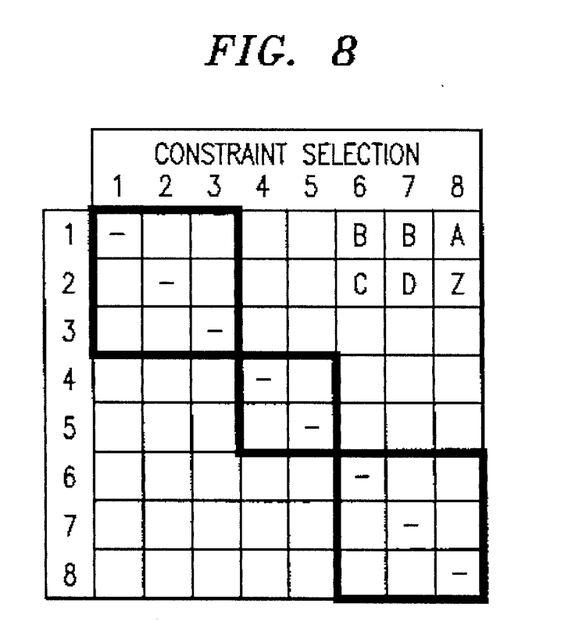
FIG. 8 illustrates a table in which a matrix is provided to select routing constraints shown in FIG. 7 based on the origination and destination switches.

FIG. 8 illustrates a constraint selection matrix with the switches indicated in the Y axis comprising origination switches and the switches in the X axis comprising destination switches. In the illustrative example in which switch 1 is an originating switch and switch 8 is a destination switch, it will be seen that the intersection in this matrix is an "A". The stored matrix in node 10 identifies the set in FIG. 7 (A1, A2, A3) which will be consulted in order to construct vector 66 based on the availability of switches to handle a call request. The portion of the matrix in FIG. 8 shown in bold represents constraint selection information where the origination and destination switches are within a given network. The exemplary data shown in the matrix is merely representative of a plurality of sets of data which may be stored in FIG. 7 to provide constraint selection data for a corresponding origination and destination switch.

Returning to FIG. 4, vector 66 represents other constraints which prohibit switches 1, 4, 7, and 8 from serving as an intermediate node. Considered from the other perspective, switches 2, 3, 5, and 6 represent possible candidates permitted by the constraints in accordance with vector 66. Vector 66 is based on data associated with the constraint selection group "A" defined in FIG. 8 and the corresponding data stored in table 7 associated with constraints represented as data in rows A1–A3. Vector 66 is generated by network management node 10 by reference to the data in rows A1–A3 in FIG. 7.

Vector 60 and vector 66 are combined by a logical ANDing by AND gate 68 to produce a resulting final path candidate vector 70 as shown in step 72. Vector 70 indicates that final path candidates as an intermediate switch between switches 1 and 8 include switches 3, 5, and 6 which each have lightly loaded trunk groups connected to both switches 1 and 8, and comply with the other constraint criteria associated with vector 66.

Figure 6:
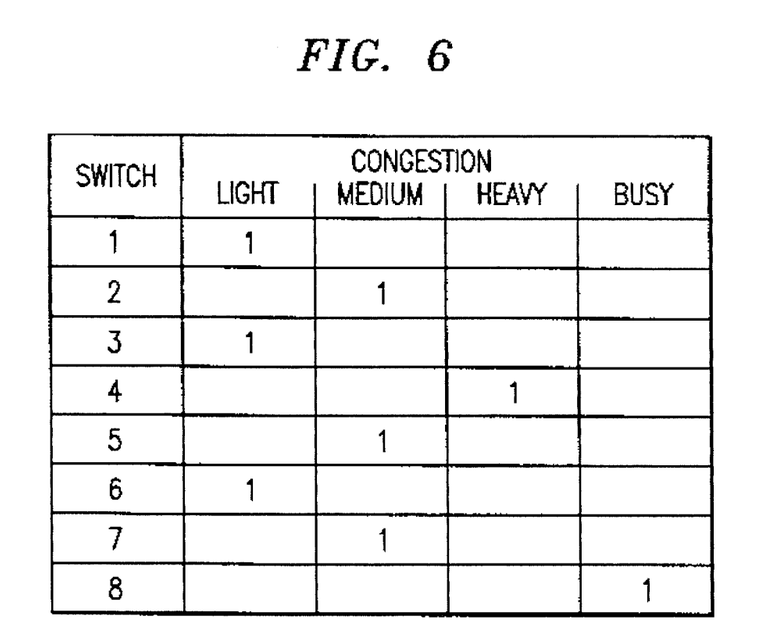
FIG. 6 illustrates a table in which the congestion associated with the switches is shown.

Step 74 illustrates a switch congestion vector 76 which is generated by network management node 10 based on information stored in a table as represented by FIG. 6. The congestion data for each switch shown in FIG. 6 indicates a relative measure of total switch loading for each of the eight switches and includes switch loading factors in addition to the traffic load associated with the trunk groups connected to each switch. For example, additional processing loads may be required by a switch to provide maintenance or other associated processing requirements which will present switch loading constraints which would not be observed if only the trunk group loading patterns were considered. The data shown in FIG. 6 is stored in a table in the network management node 10 and may be based upon data transmitted by the switches in substantial real time to node 10 or may comprise predetermined historical based data provided to represent known or anticipated switch loading factors for the switches. The table illustrates that switches 1, 3, and 6 have light congestion; switches 2, 5, and 7 have medium congestion; switch 4 is heavily congested; and switch 8 is busy, meaning that it is at capacity with little or no additional processing capabilities beyond its present load.

Returning to FIG. 4, vector 76 represents the switch congestion status of the switches at the time the call request is being processed and helps determine the selection of an intermediate switch. Vector 76 shows that switches 1, 3, and 6 are best suited for consideration as an intermediate node since each is characterized as lightly loaded in accordance with the data stored in the table shown in FIG. 6.

Step 78 illustrates a vector 80 representing a switch or switches suited for serving as an intermediate switch for the corresponding call request. Vector 80 is the result of the logical AND combining of vectors 70 and 76 as indicated by AND gate 82. Vector 80 indicates that switches 3 and 6 represent the two better choices for selection as an intermediate node to carry a call originating from switch 1 to a destination switch 8.

The criteria in accordance with a preferred aspect of the present invention has resulted in the selection of two possible intermediate switches, both of which have lightly loaded trunk groups, meet other constraint criteria, and have a corresponding switch congestion of a light load. In a further preferred aspect of the present invention, previous intermediate switch selections are stored in memory at node 10 and are utilized to provide a circular or rotating selection of intermediate switches when more than one switch is selectable in accordance with vector 80. In the illustrative example, the historical selection of switches as intermediate switches stored in network management node 10 may indicate that as between switches 3 and 6, switch 6 was most recently selected to act as an intermediate switch. Thus, in accordance with the desired distribution of load, switch 3 would be selected to serve as an intermediate node for the current call request. In accordance with this selection, network management node 10 will generate and transmit control signals to the origination switch 1, intermediate switch 3, and destination switch 8 advising the switches of the corresponding call to be accepted and established. Preferably, each of the switches will acknowledge the receipt of the commands and will also confirm the ability of the respective switches and the associated trunk groups to process the requested call. This acknowledgment is desired since it is possible that the selected routing path may be unavailable, thereby requiring an alternate selection of a path by the network management node 10 provided predetermined routing rules of the network permit an alternate path selection.

In the above example, two intermediate switches were determined to be selectable based upon vector 80. If any of the vector products, e.g. vectors 60 or 70, yields a null vector, i.e. a vector consisting of all zeros, the network management node 10 preferably will begin a new selection process at the last preceding step which yielded no choices. For example, if vector 60 yielded no intermediate switch choices, the method would preferably restart with the recalculation of one of vectors 52 or 56 in which one of the vectors maintains a lightly loaded criteria and the other vector criteria changes to a medium loaded condition. If this yielded a vector 60 with no choices, both vectors 52 and 56 would escalate to use a medium loaded path criteria. Vectors 52 and 56 would be incremented from lightly to medium to heavy loaded conditions in order to generate a vector 60 which contained at least one potential intermediate switch choice. Assuming that the other constraints represented by vector 66 are not within the control of the network management node and cannot be altered, the failure to yield a final path candidate in vector 70 would also result in the recalculation of path loading vectors 52 and 56 in order to yield at least one final path candidate in vector 70.

The failure to produce a vector 80 having at least one selectable switch results in: (a) the recalculation of vectors 52 and 56 as explained above; (b) recalculation of switch congestion vector 76 to consider switches with increasing levels of congestion; or (c) both, in order to produce a switch selection vector 80 having at least one choice. Preferably, these steps are incremental in order to select a switch vector 80 with the lowest possible level of loading for the trunk groups and switch congestion conditions. Thus, the illustrative embodiment of the present invention provides a method for selecting intermediate switches which utilizes the lightest loaded available trunk groups in combination with the switches having the lightest congestion and loading. This results in call distribution which increases loading of the lightest loaded trunk groups and switches which can best accommodate the increased traffic. This minimizes the likelihood of blocked calls due to uneven or poorly distributed traffic loads. It further provides an opportunity for heavily loaded and busy trunk groups and switches to gradually reduce the traffic load since additional calls will not be placed on these resources, thereby allowing these resources to naturally reduce the traffic loads as existing calls on the resources are terminated by the users.

Referring to FIG. 4, an alternate embodiment of a method in accordance with the present invention may be utilized where information is not available to generate one of the path loading vectors 52 and 56. Assume for this condition destination switch 8 in network 3 did not provide the network management node 10 with information needed to generate vector 56. In this condition vector 52 associated with origination switch 1 in network 1 can be utilized as vector 60 which effectively assumes the vector 56 to be all "1"s. The remainder of the method proceeds as previously described.

In accordance with the present invention, it is preferred that traffic loading information be received by network management node 10 in substantially real time from the switches in the system so that the vectors generated by the node 10 will be based on current information and reflect current loading conditions. Of course, longer time intervals could be utilized to transmit traffic data to node 10 such as every hour or at other intervals. However, the longer the intervals, the less current the information and hence, the less likely the best selection of an intermediate node.

The light, medium, heavy, and busy path loading ranges for the switches as illustrated in FIG. 5 may be defined and computed in a variety of ways depending upon the system. One way of determining the path loading categories is to define corresponding ranges of blocking levels of calls associated with the final and mutual final trunk groups within the system. The blocking level for a final trunk group can be determined from the formula:

$$BF = \frac{bids - Oseize}{bids}$$

where BF is the blocking of the final trunk group, bids are the number of requests in the corresponding trunk group, and Oseize is the number of outgoing seizures. The blocking for mutual final trunk group can be determined from the formula:

$$BMF = 1 - \frac{Oseize + Mover}{bids}$$

where BMF is the blocking in the mutual final trunk group, and Mover is the overflow to the mutual final trunk group. Preferably, information concerning the number of requests or bids, the number of outgoing seizures and the overflow to mutual final trunk groups is maintained as traffic data at each switch and transmitted to the network management node 10 which computes the blocking levels and converts the corresponding blocking levels into range categories of blocking, resulting in the generation of the data shown in FIG. 5.

In accordance with the present invention, it is possible to generate effective control and selection of intermediate switches in a system in which non-homogenous switches are utilized and where switches are disposed in a plurality of different networks. The centralized routing control provided by the network management node 10 provides an additional advantage in that different levels of loading and definitions of traffic load conditions can be easily changed since such information is defined and controlled at a single point in the system as opposed to distributed control exercised by the switches. Further, overall congestion of the switches is also considered and is preferably utilized in the selection of an intermediate switch. These and other advantages are believed to be apparent to one skilled in the art based upon the above-described embodiments of the present invention.

Although embodiments of the present invention have been described above and shown in the figures, the scope of the invention is defined by the claims which follow.

I claim:

1. In a telecommunication network having a plurality of switches interconnected by groups of communication channels, each switch periodically generating traffic data indicative of the volume of calls on the respective groups of communication channels, a method for automatically selecting a routing path for calls from an originating switch via an intermediate switch to a destination switch, the method comprising the steps of:

receiving and storing at a network management node coupled to said switches said periodically generated traffic data from a set of said switches said set of switches containing certain switches which are not homogeneous and do not share the same operating architecture;

generating at least a first vector at said network management node based on said stored traffic data, said first vector containing a first element for each group of communication channels associated with one switch in said set of switches, said first elements defining if a predetermined traffic level exists on the corresponding groups of communication channels associated with the one switch;

generating a path constraint vector at said network management node based on predetermined routing factors stored at said network management node, said path constraint vector containing an element for each switch in said set of switches, each of said path constraint vector elements defining if a corresponding switch is available to serve as the intermediate switch;

comparing said first vector elements and corresponding path constraint vector elements to produce a resulting selection vector with an element corresponding to each switch in said set of switches, said constraint vector elements determining whether a corresponding switch is a candidate for selection as the intermediate switch;

selecting one of said candidate switches as the intermediate switch through which calls from said originating switch pass to the destination switch.

2. The method according to claim 1 further comprising the steps of receiving and storing said traffic data at a periodic interval less than one hour, said generating of a first vector, comparing step, and selecting step being executed during said periodic interval so that current traffic data is utilized to produce the candidate switches.

3. The method according to claim 2 wherein said periodic interval is substantially in real time.

4. The method according to claim 1 wherein the step of generating at least a first vector comprises the step of generating a set of traffic vectors at said network management node based on said stored traffic data, said traffic vectors each containing an element for each group of communication channels associated with said one switch in said set of switches, each of said traffic vectors corresponding to a predetermined range of traffic levels present on the groups of communication channels associated with said one switch in said set of switches, said elements in the traffic vectors defining if groups of communication channels associated with a switch have a traffic level with the predetermined range of the traffic vector, said first vector being associated with the lowest traffic range of said predetermined ranges.

5. The method according to claim 4 further comprising the step of determining if at least one candidate switch is identified by said comparing step, if at least one candidate switch is identified then said selecting step selecting one of said candidate switches as the intermediate switch, whereby intermediate switches with the lowest traffic rates are selected.

6. The method according to claim 5 further comprising the step of comparing the traffic vector associated with the next lowest traffic level and the path constraint vector to determine if a candidate switch exists when a previously compared traffic vector did not result in an intermediate switch candidate.

7. The method according to claim 1 further comprising the steps of determining at the network management node a level of overall loading for each switch in said set of switches, and said selecting step selecting said one switch from among candidates based on the determined level of switch loading.

8. In a telecommunication network having a plurality of switches interconnected by groups of communication channels, each switch periodically generating traffic data indicative of the volume of calls on the respective groups of communication channels, a method for automatically selecting a routing path for calls from an originating switch via an intermediate switch to a destination switch, the method comprising the steps of:

receiving and storing at a network management node coupled to said switches said periodically generated traffic data from a set of said switches;

generating first and second vectors at said network management node based on said stored traffic data associated with the originating and destination switches, respectively, said first and second vectors containing elements for each group of communication channels associated with the origination and destination switches, respectively, said elements defining if a predetermined traffic level exists on the corresponding groups of communication channels;

comparing the respective elements of the first and second vectors to produce a resulting third vector that identifies intermediate switches with said predetermined traffic levels connected with groups of communication channels to both said origination and destination switches;

determining at the network management node a level of overall loading for each switch in said set of switches:

selecting one of said identified intermediate switch through which calls from said originating switch pass to the destination switch based on the determined level of switch loading.

9. The method according to claim 8 further comprising the steps of:

generating a path constraint vector at said network management node based on predetermined routing factors stored at said network management node, said path constraint vector containing an element for each switch in said set of switches, each of said path constraint vector elements defining if a corresponding switch is available to serve as the intermediate switch;

comparing said third vector elements and corresponding path constraint vector elements to produce a resulting selection vector with an element corresponding to each switch in said set of switches, said constraint vector elements determining whether a corresponding switch is a candidate for selection as the intermediate switch.

10. The method according to claim 9 further comprising the steps of receiving and storing said traffic data at a periodic interval less than one hour, said generating of a first vector, comparing step, and selecting step being executed during said periodic interval so that current traffic data is utilized to produce the candidate switches.

11. The method according to claim 10 wherein said periodic interval is substantially in real time.

12. The method according to claim 8 wherein the step of generating comprises the step of generating first and second sets of traffic vectors at said network management node based on said stored traffic data, said first and second sets of traffic vectors each containing an element for each group of communication channels associated with said origination and destination switches, respectively, said first and second sets of traffic vectors corresponding to a predetermined range of traffic levels present on the groups of communication channels associated with said origination and destination switches, respectively, said elements in said first and second sets of traffic vectors defining if groups of communication channels associated with said origination and destination switch have a traffic level with the predetermined range.

13. The method according to claim 12 further comprising the step of determining if at least one candidate switch is identified by said comparing step, if at least one candidate switch is identified then said selecting step selecting one of said candidate switches as the intermediate switch, whereby intermediate switches with the lowest traffic rates are selected.

14. The method according to claim 13 further comprising the step of comparing ones of the first and second sets of traffic vectors associated with a next lowest traffic level to produce a resulting third vector, and comparing the third vector and the path constraint vector to determine if a candidate switch exists where a previously compared third vector and traffic vector did not result in an intermediate switch candidate.

15. The method according to claim 8 wherein said set of switches contains certain switches which are not homogeneous and do not share the same operating architecture.

16. A network management node that controls the routing of calls in a telecommunication network having a plurality of switches interconnected by groups of communication channels, each switch periodically generating traffic data indicative of the volume of calls on the respective groups of communication channels, the node automatically selecting a routing path for calls from an originating switch via an intermediate switch to a destination switch, the network management node comprising:

means for receiving and storing said periodically generated traffic data from a set of said switches, said set of switches containing certain switches which are not homogeneous and do not share the same operating architecture;

means for generating at least a first vector based on said stored traffic data, said first vector containing a first element for each group of communication channels associated with one switch in said set of switches, said first elements defining if a predetermined traffic level exists on the corresponding groups of communication channels associated with the one switch;

means for generating a path constraint vector based on predetermined routing factors stored in a table at said network management node, said path constraint vector containing an element for each switch in said set of switches, each of said path constraint vector elements defining if a corresponding switch is available to serve as the intermediate switch;

means for comparing said first vector elements and corresponding path constraint vector elements to produce a resulting selection vector with an element corresponding to each switch in said set of switches, said constraint vector elements determining whether a corresponding switch is a candidate for selection as the intermediate switch;

means for selecting one of said candidate switches as the intermediate switch through which calls from said originating switch pass to the destination switch.

17. The node according to claim 16 wherein said receiving and storing means receives and stores said traffic data at a periodic interval less than one hour, said generating means, comparing means, and selecting means functioning within said periodic interval so that current traffic data is utilized to produce the candidate switches.

18. The node according to claim 17 wherein said periodic interval is substantially in real time.

19. The node according to claim 16 wherein the generating means comprises means for generating a set of traffic vectors based on said stored traffic data, said traffic vectors each containing an element for each group of communication channels associated with said one switch in said set of switches, each of said traffic vectors corresponding to a predetermined range of traffic levels present on the groups of communication channels associated with said one switch in said set of switches, said elements in the traffic vectors defining if groups of communication channels associated with a switch have a traffic level with the predetermined range of the traffic vector, said first vector being associated with the lowest traffic range of said predetermined ranges.

20. The node according to claim 19 further comprising means for determining if at least one candidate switch is identified by said comparing step, if at least one candidate switch is identified then said selecting means selecting one of said candidate switches as the intermediate switch, whereby intermediate switches with the lowest traffic rates are selected.

21. The node according to claim 20 further comprising means for comparing the traffic vector associated with the next lowest traffic level and the path constraint vector when a previously compared traffic vector did not result in an intermediate switch candidate.

22. The node according to claim 16 further comprising means for determining a level of overall loading for each switch in said set of switches, and said selecting means selecting said one switch from among candidates based on the determined level of switch loading.

23. The node according to claim 16 further comprising means for transmitting control signals to the intermediate switch selected by the selecting means to effectuate the setting up of a corresponding call through the selected intermediate switch.

* * * * *